Aug. 31, 1965     F. J. OVERCASH     3,204,237
AIRCRAFT STATION KEEPING AND TERMINAL NAVIGATION SYSTEM
Filed April 8, 1963                    4 Sheets-Sheet 1

FIG_1

INVENTOR.
FRANK J. OVERCASH
BY
*George C. Sullivan*
Agent

FIG_2

INVENTOR.
FRANK J. OVERCASH

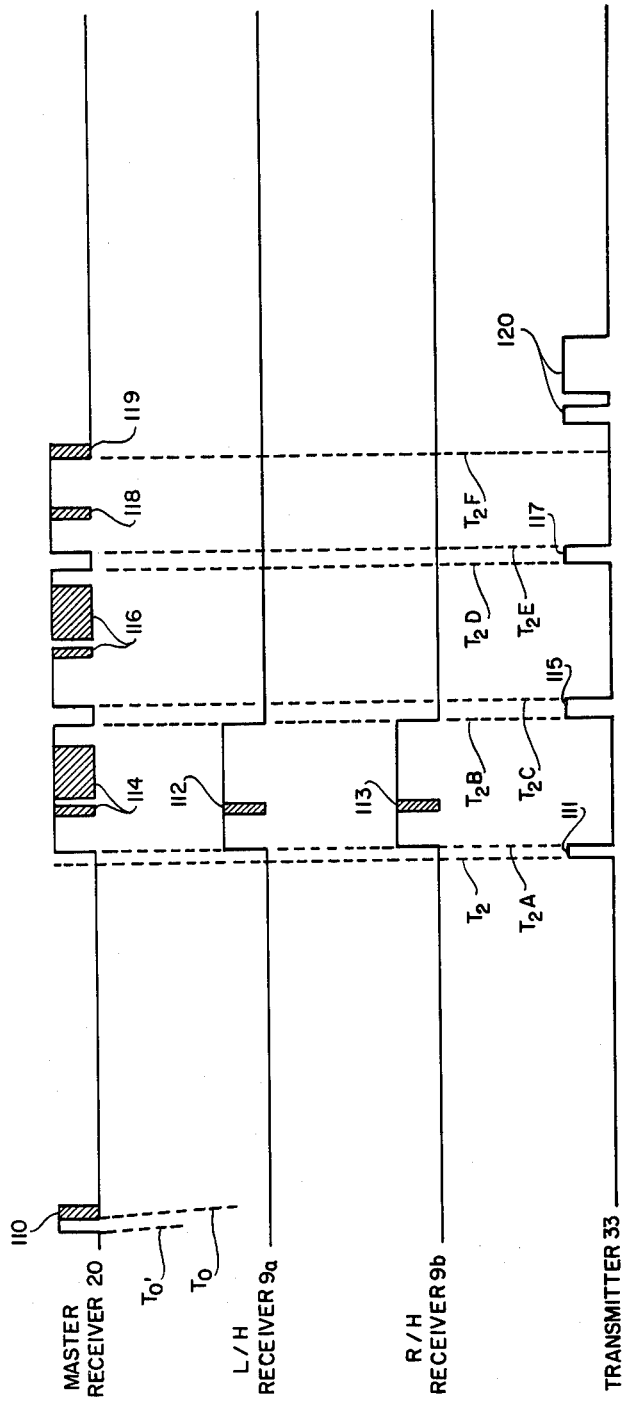
FIG_4

United States Patent Office 3,204,237
Patented Aug. 31, 1965

3,204,237
AIRCRAFT STATION KEEPING AND TERMINAL NAVIGATION SYSTEM
Frank J. Overcash, Atlanta, Ga., assignor to Lockheed Aircraft Corporation, Burbank, Calif.
Filed Apr. 8, 1963, Ser. No. 271,445
9 Claims. (Cl. 343—6.5)

This invention relates to an aircraft station keeping and terminal navigation system, and more particularly to a transponder system for indicating the position of one aircraft relative to another and for indicating the position of the aircraft relative to a point on the ground.

To render cargo aircraft effective under all weather conditions, it is desirable to provide such aircraft with the capability of determining their position relative to other aircraft in formation and with the capability of accurately navigating to the desired drop zone with accuracy by the use of instruments. For performing these functions, this invention provides a navigation system utilizing conventional transponders arranged and electrically interconnected to provide electrical signals indicative of the position of one aircraft relative to another and indicative of the position of each aircraft relative to a drop zone. Altitude information on the aircraft ahead and ground wind information at the drop zone are also provided. For economy and simplicity, each aircraft in the formation is provided with identical transponder equipment operating in time-sharing fashion.

Accordingly, it is an object of this invention to provide a transponder navigation system for indicating the position of one aircraft relative to another.

Another object of this invention is to provide each aircraft in a formation with transponder equipment for indicating its position in the formation relative to the aircraft immeditaely ahead of it in the formation, the transponder system of each aircraft operating in time-sharing fashion with respect to the other transponder systems.

A further object of this invention is to provide an aircraft with a transponder system for indicating the position of one aircraft relative to another aircraft and for indicating the position of the aircraft relative to a drop zone.

Still a further object of this invention is to provide an aircraft with a transponder system capable of permitting station keeping of the aircraft at an offset, or combined trailing and lateral position with respect to another aircraft as well as the capability of indicating the aircraft path along an offset course with respect to the perpendicular bisector of a line connecting two spaced apart ground station transponders.

Other objects and advantages of this invention will become more apparent from the following description taken in connection with the accommpanying drawings in which:

FIGURE 4 is a timing diagram depicting the operate relationship of the components of one aircraft station keeping and terminal navigation system.

Generally stated, this invention comprises an aircraft pulse transponder system for indicating the position of one aircraft relative to another and for indicating the position of the aircraft relative to a predetermined area or position. Each of a plurality of aircraft carries identical equipment including a centrally mounted transponder unit and receiver units mounted on opposite sides thereof. The transponder of one aircraft interrogates the transponder of the next aircraft ahead in the formation, and the reply signal transmitted thereby is received in the receiver units of the interrogating aircraft. This reply signal is operated upon for measurement of the separation distance between the aircraft and to obtain an indication of the lateral deviation of the interrogating aircraft from the track of the aircraft it is following. To avoid cross-talk or overlap interference between aircraft, a time-sharing feature is incorporated into the system wherein a single operating frequency is shared by all aircraft under control of synchronized time allocation units in each aircraft. Each aircraft transponder can also interrogate ground located transponders, the reply pulses formed thereby being received by the transponder which in turn are electrically operated upon to determine the range to the drop zone and the lateral deviation of the aircraft with respect to the perpendicular bisector of a line drawn between the ground stations. Also, provisions are included in each navigation system for processing altitude information on the aircraft immediately ahead and ground wind information.

Figure 1:
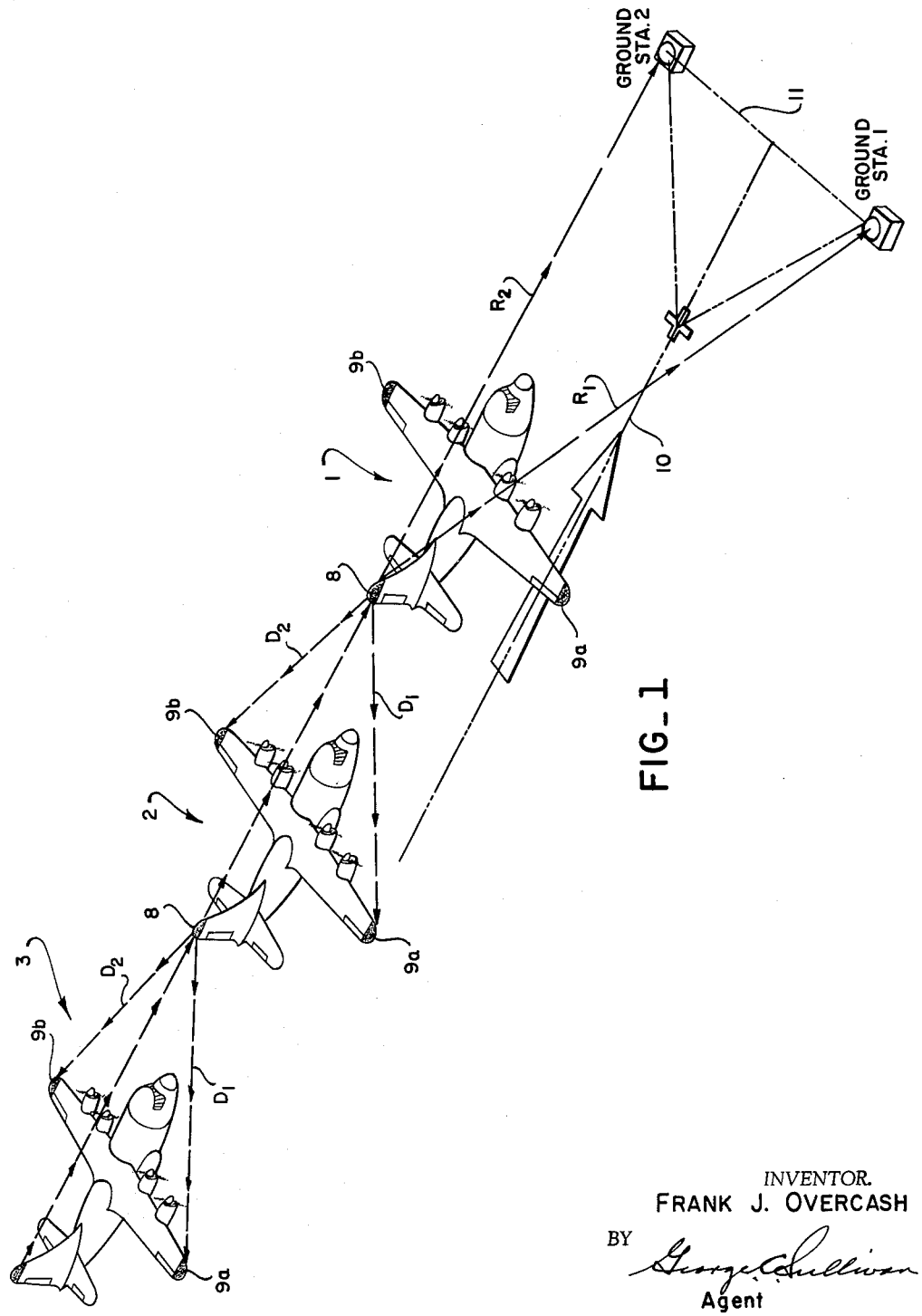
FIGURE 1 is a diagrammatic pictorial view of a flight of aircraft employing the aircraft station keeping and terminal navigation system of this invention.

More specifically, there is shown in FIGURE 1 aircraft 1, 2 and 3 flying in formation, each having a navigation system comprising a conventional transponder 8, including a transmitter and a master receiver, mounted in its vertical stabilizer with conventional crystal video receiver units 9a and 9b spaced on opposite sides of the transponder 8 and located in the aircraft wing tips. The aircraft are disclosed as flying in a line formation along the line of flight or track 10 so as to intercept the line 11 drawn between the spaced apart conventional ground station 1 and ground station 2 transponder units.

For station keeping purposes and operation, the transponder 8 of each aircraft, except for the first in the formation, interrogates the transponder 8 of the aircraft immediately ahead of it in formation, which upon interrogation transmits a reply distance signal along the distance lines $D_1$ and $D_2$ to receivers 9a and 9b. Along track separation distance is obtained by measuring the average of the elapsed time between the transmitted signal and the time in receipt of the reply signal by the receivers 9a and 9b. Lateral or cross-track displacement is obtained by measuring the non-coincidence in time of receipt of the reply signal in receivers 9a and 9b. The distance reply signal also includes altitude information which is received for processing by the transponder 8.

For terminal navigation purposes and operation, the transponder 8 of each aircraft in formation can interrogate the ground station 1 and 2 transponders which upon interrogation successively transmit reply range signals along the range lines $R_1$ and $R_2$ to transponder 8. Along track range is obtained by measuring the average of the elapsed time between the transmitted signal and the reply signals, and lateral displacement from the perpendicular bisector of a line drawn between the ground stations is obtained by measuring the difference in ranges $R_1$ and $R_2$. The range reply signal from ground station 1 can also include ground wind information for processing by transponder 8.

It will be appreciated from the above that the precise location of one aircraft relative to the aircraft ahead of it in formation and relative to the ground stations 1 and 2 may be obtained by making simple time measurements and by averaging and comparing these measurements. In accordance with this invention, these time measurements are accomplished by conventional measuring circuitry incorporating time-sharing features to permit operation of the equipment on the same frequency without interference with conventional variable delays to permit compensation for yaw of the aircraft and to permit lateral deviation from an along track course. One preferred integrated system for carrying out these objectives is set out in greater detail hereinafter.

Figure 2:
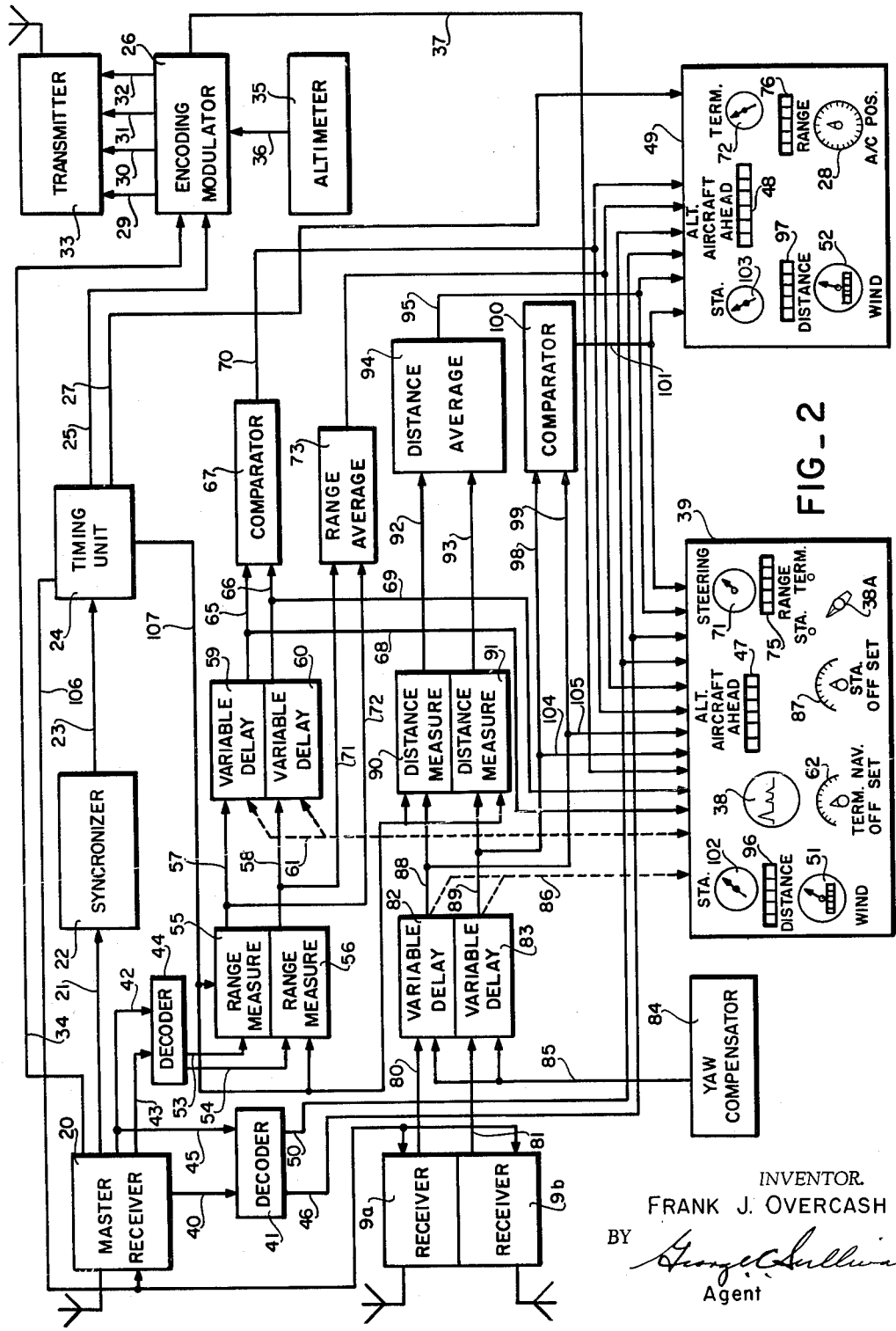
FIGURE 2 is a schematic circuit diagram of a station keeping and terminal navigation system for an aircraft of FIGURE 1.

More specifically, the navigation system of each aircraft, as seen in FIGURE 2, comprises a master receiver 20 connected by lead 21 to supply master timing pulses received from one aircraft in the formation to the synchronizer 22. The synchronizer is connected by lead 23 to the timing unit 24, which may be a crystal controlled oscillator, operative to time compare and synchronize the timing unit with respect to periodic master timing pulses. The timing unit 24 comprises conventional timing circuitry for fixing the cycle of operation of the navigation system and includes circuitry for gating the main components on and off during each cycle of operation. Also, the timing unit 24 of each aircraft in formation includes circuitry for forming master timing pulses, which may be connected to the encoding modulator 26 if so desired. The timing unit 24 also includes selectively adjustable delay circuitry for selectively adjusting the operating time period of the navigation system of each aircraft in accordance with the position of the aircraft in the formation to permit the operation of the navigation systems of all the aircraft on the same frequency. For convenience of explanation, the time at which a master timing pulse is received is taken as a time reference. Thus, the delay circuitry of timing unit 24 may be said to be selectively adjustable as a function of the position of the aircraft in the formation for the application of an enabling pulse through lead 25 to the encoding modulator 26 upon the expiration of a preselected delay period after receipt of a master timing pulse. It is to be understood, however, that the timing unit 24 initiates a cycle of operation whether or not it receives a master timing pulse. For setting the appropriate delay in the timing unit 24, a lead 27 connects the timing unit to manual position select switch 28 on the pilot's console 49. The encoding modulator 26 includes sequencing circuitry, coding circuitry and is output connected by leads 29, 30, 31 and 32 to transmitter 33. The master receiver 20, encoding modulator 26 and transmitter 33 would normally be included in the conventional transponder 8. Upon receipt of an enabling pulse, transmitter 33 sequentially forms and supplies to the transmitter 33 a coded aircraft interrogation signal through lead 29, a coded ground station 1 interrogation signal through lead 30, and a coded ground station 2 interrogation signal through lead 31. During a time segment allocated in this sequence, the encoding modulator 26 receives an interrogation signal from the aircraft immediately behind it through lead 34, codes a reply signal including an altitude signal received from altimeter 35 through lead 36, and supplies such signal to transmitter 33 through lead 32. Encoding modulator 26 is also output connected by lead 37 to the cathode ray tube (C.R.T.) 38 on the navigator console 39 for starting the sweep thereof upon transmission of the aircraft or ground station interrogation signals, depending upon the position of selector switch 38a. This provides the navigator with an A scope display of the transmitted interrogation pulses with which he can time compare range and distance signals.

Additionally, the master receiver 20 is connected by lead 40 to decoder 41 and by leads 42 and 43 to decoder 44, the lead 42 being additionally connected by lead 45 to decoder 41. Coded altitude information received from the interrogated aircraft is supplied to decoder 41, and range $R_2$ information received from ground station 2 is supplied through lead 43 to decoder 44. The signal received from ground station 1 includes both coded range $R_1$ and coded ground wind information; such signal being supplied simultaneously through lead 42 to decoder 44, which decodes the range $R_1$ information, and through leads 42 and 45 to decoder 41 which decodes the ground wind information. Decoder 41, in turn, is connected by lead 46 to supply altitude information on the aircraft immediately ahead of it in the formation to the altitude indicator 47 on the navigator console 39 and to the altitude indicator 48 on pilot console 49. Decoder 41 is also connected by lead 50 to supply ground wind information to the wind indicators 51 and 52 on the navigator console 39 and pilot console 49, respectively. The decoder 44, on the other hand, is connected by leads 53 and 54 to supply the reply range signals received from ground stations 1 and 2, respectively, through leads 42 and 43 to the range measuring units 55 and 56, respectively, which may for example be conventional radar ranging units. In one typical implementation of the range measuring units 55 and 56, the timing unit 24 would initiate start pulses coincident with the transmission of interrogation signals to ground stations 1 and 2 which are supplied through lead 107 to range measuring units 55 and 56, respectively. Upon receipt of its start pulse, range measuring unit 55 initiates the generation of a saw-toothed wave form. Upon receipt of the range reply signal from ground station 1, this wave form is held at the instantaneous value of voltage it has attained during the time interval between transmission of the ground station 1 interrogation signal and receipt of the range reply signal. In a like manner, a voltage is built up in range measuring unit 56 to a value which depends upon the time interval between transmission of the ground station 2 interrogation signal and receipt of the range reply signal. In this manner, voltages proportional to ranges $R_1$ and $R_2$ are formed in range measuring units 55 and 56, respectively.

The range measuring units 55 and 56 are connected by leads 57 and 58 to conventional variable delays 59 and 60, respectively. For selectively adjusting the variable delays 59 and 60 to compensate for inherent system delays in the lines caused by receiver and cable differences and to selectively adjust the approach path of the aircraft, mechanical adjust linkage 61 is provided for connecting the variable delays to the manual adjust switch 62 on the console 39. The variable delays 59 and 60 are then connected by leads 65 and 66 to the comparator 67, and leads 65 and 66 are also connected by leads 68 and 69 to the C.R.T. 38 to modulate the sweep thereof and provide a visual A scope display of the separation distance between the range pulses received from ground stations 1 and 2 when the terminal navigation mode of operation for C.R.T. 38 is selected by operation of select switch 38a.

In the comparator 67, the voltage or range signals received from the variable delays 59 and 60 are compared to obtain an error signal proportional to the difference in ranges $R_1$ and $R_2$ to ground stations 1 and 2. The error signal thus formed in the comparator 67 is fed through lead 70 to the terminal navigation steering indicators 71 and 72 of the consoles 39 and 49, respectively. If the aircraft is flying on the perpendicular bisector of the line drawn connecting ground stations 1 and 2 (as seen in FIGURE 1), the ranges $R_1$ and $R_2$ from transponder 8 to ground stations 1 and 2, respectively, will be the same and no error signal will be produced so that the indicators 71 and 72 will not be deflected from the zero position. If, however, the aircraft is flying on other than the perpendicular bisector, the ranges $R_1$ and $R_2$ will be different, hence the range signals from transponder 8 will not be equal and an error signal indicative of the displacement of the aircraft in either direction from the perpendicular bisector will be formed in comparator 67 to deflect the indicators 71 and 72 in the appropriate direction indicating the corrective action required to bring the aircraft back on course. When it is desired to intercept the line connecting ground stations 1 and 2 along other than the perpendicular bisector, the variable delays 59 and 60 can be mechanically adjusted by control knob 62 to introduce a time delay in one of the range measurements so that the indicators will be deflected when the aircraft is flying a course along the perpendicular bisector but will not be deflected when flying the desired offset course.

For obtaining range to the ground stations, range measuring units 55 and 56 are connected by leads 63 and 64 to range averaging unit 73 which averages the voltage received from the range measuring units. Range averaging unit 73 in turn is output connected by lead 74 to the range indicators 75 and 76 on the consoles 39 and 49 respectively.

The aircraft navigation system also includes the receivers 9a and 9b for receipt of coded distance reply signals from the transponder 8 of the aircraft ahead in formation indicative of distances $D_1$ and $D_2$ from receivers 9a and 9b of aircraft 2 to the transponder 8 of aircraft 1. The receivers 9a and 9b are connected by leads 80 and 81 to variable delays 82 and 83. For adjusting the variable delays to compensate for yaw experienced under cross wind conditions, a conventional yaw compensator 84, which may be a Doppler radar or drift meter, supplies calibrated delay corrections through lead 85 into the variable delays. Also, mechanical linkage 86 connects the variable delays 82 and 83 to a mechanical adjust control knob 87 on the navigation console 39 to permit relative adjustment of the distance signal delays to permit flying of the aircraft on an offset course with respect to the aircraft ahead with the instruments indicating any deviation from this offset course.

Variable delays 82 and 83 are output connected by leads 88 and 89 to distance measuring units 90 and 91, preferably of the same type as range measuring units 55 and 56, which in turn are connected by leads 92 and 93 to distance averaging unit 94. The output of the distance averaging unit is fed through lead 95 to the distance indicator 96 on navigator console 39 and the station keeping range indicator 97 of the pilot console 49.

To provide a station keeping heading signal, leads 98 and 99 connect leads 88 and 89 to comparator 100 which is operative to measure the non-coincidence in time of receipt by receivers 9a and 9b of the reply signal from transponder 8 of the aircraft immediately ahead in formation in a conventional manner. Comparator 100, in turn, is connected by lead 101 to indicator 102 on the console 39 and station keeping steering or heading signal indicator 103 on console 49. Also, leads 104 and 105 are connected from leads 98 and 99 to the C.R.T. 38 to modulate the sweep thereof and provide distance pulses on the A scope display when the station keeping mode of operation for cathode ray tube 38 is selected by operation of select switch 38a. To complete the navigation system, a lead 106 connects the timing unit 24 to supply gating pulses to the master receiver 20 and the receivers 9a and 9b.

Figure 3:
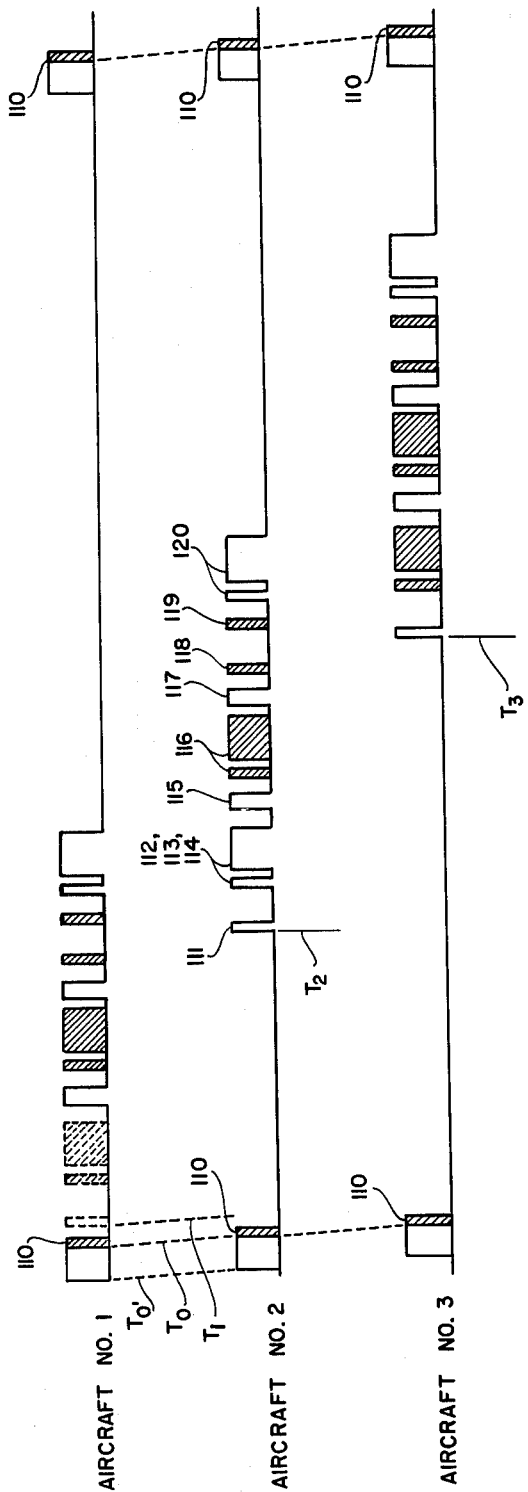
FIGURE 3 is a timing diagram depicting the relationship of the operate cycles of the aircraft of FIGURE 1 while flying in station keeping formation.

Referring to FIGURES 3 and 4 for operation details, the master receiver 20 of each trailing aircraft in formation is gated on by its timing unit 24 at time $T_0'$, and receives a master timing pulse from aircraft 1 at time $T_0$, which time is taken as a time reference. Master receiver 20 is automatically turned off after receipt of the master timing signal. Upon receipt of a master timing signal, the timing unit 24 of each aircraft is compared and synchronized with respect thereto and after the expiration of the delays $T_1$, $T_2$ and $T_3$, placed in the timing unit circuitry of each aircraft 1, 2 and 3, for example, by operation of position select switch 28, the operate cycle of each aircraft continues. Since the operate cycle of each of the aircraft is identical, the discussion will be limited to the operation of the aircraft 2 navigation system schematically detailed in FIGURE 4.

After receipt of the master timing pulse 110 at time $T_0$ by aircraft 2 and after the expiration of time delay $T_2$, timing units 24 sends an enabling pulse to encoding modulator 26 which in turn codes an interrogation signal 111 for transmittal by transmitter 33 to the aircraft 1 ahead of it in formation. At the time interrogation signal 111 is transmitted, the encoding modulator 26 applies a start pulse to the sweep of C.R.T. 38 when select switch 38a is in the station keeping position. Immediately after transmittal of the aircraft 1 interrogation signal 111 at time $T_2A$, timing unit 24 gates on the receivers 9a, 9b and master receiver 20 enabling them to receive the reply signal from the interrogated aircraft 1. This reply signal includes both distance and altitude information and the receivers 9a and 9b are responsive to the distance portion of the signal while the master receiver 20 is responsive to the altitude portion of the signal. For ease of description this reply signal will be referred to as signals 112, 113 and 114 when associated with receivers 9a, 9b and master receiver 20, respectively. The signals 112 and 113 are indicative of the distances $D_1$ and $D_2$ (FIGURE 1) from receivers 9a and 9b of aircraft 2 to transponder 8 of aircraft 1. These distance reply signals 112 and 113 are processed to obtain the average of distances $D_1$ and $D_2$ to obtain an indication of the separation distance between aircraft 1 and 2. The signals 112 and 113 are also compared to obtain an error signal due to their non-coincidence in arrival time at receivers 9a and 9b. This error signal provides an indication of any deviation of aircraft 2 from the flight path of aircraft 1 for purposes of steering the aircraft. Also, upon its receipt, each distance reply signal amplitude modulates the sweep of the C.R.T. 38 when select switch 38a is in the station keeping mode to provide a visual presentation of the time difference between the receipt of the signals and their time relation with respect to the interrogation signal 111. The signal 114 received by master receiver 20 is processed by decoder 41 to obtain an indication of the altitude of aircraft 1.

Since the receivers 9a and 9b, if crystal video receivers, have a maximum effective range of approximately two miles, the time period allocated for interrogation and receipt of reply signals 112 and 113 is sufficient for a separation distance between the aircraft in the order of two miles. The receivers 9a and 9b are gated off by timing unit 24 at time $T_2B$ and remain off until gated on in the next cycle at $T_2A$. Also at time $T_2B$, the encoding modulator 26 supplies a coded ground station 1 interrogation signal 115 to transmitter 33 for transmission and also starts the sweep of C.R.T. 38 when select switch 38a is in the terminal navigation position. After transmission of the ground station 1 interrogation signal, the master receiver 20 receives the coded range reply signal 116 during the time period beginning at $T_2C$, which includes coded ground wind information for processing by the decoder 41. In the order of microseconds past time $T_2C$, at time $T_2D$, the encoding modulator 26 supplies a coded ground station 2 interrogation signal 117 to transmitter 33 for transmission. At this time the encoding modulator 26 again starts the sweep of C.R.T. 38 which is substantially superimposed upon the start pulse generated by transmission of ground station 1 interrogation signal because of the small time difference therebetween. After transmission of the ground station 2 interrogation signal, the master receiver 20 receives the range reply signal 118 during the time period beginning at $T_2E$. The range signals 116 and 118 are processed to obtain the average of distances $R_1$ and $R_2$ to obtain an indication of the separation distance between aircraft 2 and a line connecting the ground stations. The determined ranges are compared to generate an error signal indicative of the deviation of the aircraft from the perpendicular bisector of a line connecting the ground stations for purposes of steering the aircraft. Also, upon its receipt, each range reply signal amplitude modulates the sweep of the C.R.T. 38 to provide a visual presentation of the difference in ranges $R_1$ and $R_2$ and their time relation with respect to the ground station interrogation signals 115 and 117.

At time $T_2F$, master receiver 20 of aircraft 2 receives an interrogation signal 119 transmitted by aircraft 3 at time $T_3$, whereupon aircraft 2 replies with a reply signal 120 including distance and altitude information. Upon transmission of the reply signal 120, timing unit 24 of aircraft 2 gates off its master receiver 20 until it is time to receive a master timing signal 110, whereupon the cycle is repeated. It will be appreciated that only one navigation system is operative at one time during the overall timing cycle to prevent the receipt of spurious signals by an aircraft which would adversely affect its position determinations.

It can be seen from the above that the navigation system of this invention permits a pilot to maintain his aircraft on station in formation under all weather conditions as well as permit him to detemine his position with respect to a predetermined ground station or location, which in the case of a cargo aircraft can be a drop zone.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. An aircraft navigation system for indicating a relative station relationship between two aircraft in flight formation comprising in combination:
   an aircraft;
   a transponder on said aircraft for transmitting an interrogation signal to a leading aircraft and a distance reply signal to a trailing aircraft upon interrogation thereby;
   first and second receiver units spaced apart on said aircraft and operative to receive a distance reply signal from a leading aircraft interrogated transponder;
   and a comparator connected to said receiver units operative to measure and compare the time relationship of any distance reply signal received by said receiver units from a leading aircraft interrogated transponder.

2. An aircraft navigation system for indicating a relative station relationship between two aircraft in flight formation comprising in combination:
   an aircraft;
   a transponder on said aircraft for transmitting an interrogation signal to a leading aircraft and a distance reply signal to a trailing aircraft upon interrogation thereby;
   first and second receiver units spaced apart on said aircraft and operative to receive a distance reply signal from a leading aircraft interrogated transponder;
   and means connected to said receiver units operative to measure and average any distance reply signal received by said receiver units from a leading aircraft interrogated transponder.

3. An aircraft navigation system for indicating a relative station relationship between two aircraft in flight formation comprising in combination:
   an aircraft;
   a transponder on said aircraft for transmitting an interrogation signal to a leading aircraft and a distance reply signal to a trailing aircraft upon interrogation thereby;
   first and second receiver units spaced apart on said aircraft and operative to receive a distance reply signal from a leading aircraft interrogated transponder;
   means connected to said receiver units operative to measure and average any distance reply signal received by said receiver units from a leading aircraft interrogated transponder;
   a comparator connected to said receiver units operative to measure and compare the time relationship of any distance reply signal received by said receiver units from a leading aircraft interrogated transponder;
   and adjustable variable delays connecting said means with said receiver units and said comparator with said receiver units.

4. An aircraft navigation system for indicating a relative station relationship between two aircraft in flight formation comprising in combination:
   an aircraft having a vertical stabilizer and at least one wing extending laterally from the fuselage thereof;
   a transponder mounted in the vertical stabilizer of said aircraft for transmitting an interrogation signal to a leading aircraft and a distance reply signal to a trailing aircraft upon interrogation thereby;
   a receiver unit mounted in each of an opposite pair of wing tips of said aircraft and operative to receive a distance reply signal from a leading aircraft interrogated transponder;
   means connected to said receiver units operative to measure and average any distance reply signal received by said receiver units from a leading aircraft interrogated transponder;
   and a comparator connected to said receiver units operative to measure and compare the time relationship of any distance reply signal received by said receiver units from a leading aircraft interrogated transponder.

5. An aircraft navigation system for indicating a relative station relationship between two aircraft in flight formation as well as a relative position of an aircraft to a predetermined ground station or location comprising in combination:
   first and second ground station transponders located on the ground in spaced apart relation for transmitting a reply range signal upon receipt of a ground station interrogation signal;
   an aircraft;
   an aircraft transponder including a transmitter and master receiver on said aircraft for transmitting an aircraft interrogation signal to a leading aircraft, a ground station interrogation signal to said first and second ground station transponders, and a distance reply signal to a trailing aircraft upon interrogation thereby;
   first and second receiver units spaced apart on said aircraft operative to receive a distance reply signal from a leading aircraft interrogated transponder;
   first means connected to said first and second receiver units operative to measure and average any distance reply signal received by said receiver units from a leading aircraft interrogated transponder;
   a first comparator connected to said first and second receiver units operative to measure and compare the time relationship of any distance reply signal received by said receiver units from a leading aircraft interrogated transponder;
   second means connected to said master receiver operative to measure and average any range reply signals received by said master receiver from each of said ground stations;
   and a second comparator connected to said master receiver operative to measure and compare the time relationship of any distance reply signal received by said master receiver from said ground stations.

6. An aircraft navigation system for indicating a relative station relationship between two aircraft in flight formation as well as a relative position of an aircraft to a predetermined ground station or location comprising in combination:
   first and second ground station transponders located on the ground in spaced apart relation for transmitting a reply range signal upon receipt of a ground station interrogation signal;
   an aircraft;
   an aircraft transponder including a transmitter and master receiver mounted centrally on said aircraft for transmitting an aircraft interrogation signal to a leading aircraft, a ground station interrogation signal to said first and second ground station transponders, and a distance reply signal to a trailing aircraft upon interrogation thereby;

first and second receiver units mounted on opposite sides of said aircraft transponder operative to receive a distance reply signal from a leading aircraft interrogated transponder;

first means connected to said first and second receiver units operative to measure and average any distance reply signal received by said receiver units from a leading aircraft interrogated transponder;

a first comparator connected to said first and second receiver units operative to measure and compare the time relationship of any distance reply signal received by said receiver units from a leading aircraft interrogated transponder;

second means connected to said master receiver operative to measure and average any range reply signals received by said master receiver from each of said ground stations;

and a second comparator connected to said master receiver operative to measure and compare the time relationship of any distance reply signal received by said master receiver from said ground stations.

7. An aircraft navigation system for indicating a relative station relationship between two aircraft in flight formation as well as a relative position of an aircraft to a predetermined ground station or location comprising in combination:

first and second ground station transponders located on the ground in spaced apart relation for transmitting a reply range signal upon receipt of a ground station interrogation signal;

an aircraft having a vertical stabilizer and at least one wing extending laterally from the fuselage thereof;

an aircraft transponder including a transmitter and master receiver mounted in the vertical stabilizer of said aircraft for transmitting an aircraft interrogation signal to a leading aircraft, a ground station interrogation signal to said first and second ground station transponders, and a distance reply signal to a trailing aircraft upon interrogation thereby;

first and second receiver units mounted in each of an opposite pair of wing tips of said aircraft operative to receive a distance reply signal from a leading aircraft interrogated transponder;

first means connected to said first and second receiver units operative to measure and average any distance reply signal received by said receiver units from a leading aircraft interrogated transponder;

a first comparator connected to said first and second receiver units operative to measure and compare the time relationship of any distance reply signal received by said receiver units from a leading aircraft interrogated transponder;

second means connected to said master receiver operative to measure and average any range reply signals received by said master receiver from each of said ground stations;

and a second comparator connected to said master receiver operative to measure and compare the time relationship of any distance reply signal received by said master receiver from said ground stations.

8. A navigation system for indicating a relative station relationship between two vehicles in formation comprising in combination:

a vehicle;

a transponder on said vehicle for transmitting an interrogation signal to a leading vehicle and a distance reply signal to a trailing vehicle upon interrogation thereby;

first and second receiver units spaced apart on said vehicle and operative to receive a distance reply signal from a leading vehicle interrogated transponder;

and a comparator connected to said receiver units operative to measure and compare the time relationship of any distance reply signal received by said receiver units from a leading vehicle interrogated transponder.

9. A navigation system for indicating a relative station relationship between two vehicles in formation comprising in combination:

a vehicle;

a transponder on said vehicle for transmitting an interrogation signal to a leading vehicle and a distance reply signal to a trailing vehicle upon interrogation thereby;

first and second receiver units spaced apart on said vehicle and operative to receive a distance reply signal from a leading vehicle interrogated transponder;

and means connected to said receiver units operative to measure and average any distance reply signal received by said receiver units from a leading vehicle interrogated transponder.

No references cited.

CHESTER L. JUSTUS, *Primary Examiner.*